(12) United States Patent
Huang et al.

(10) Patent No.: US 9,646,070 B2
(45) Date of Patent: May 9, 2017

(54) ELECTRONIC APPARATUS, COMPUTER-READABLE MEDIUM AND METHOD FOR PERFORMING DATA SYNCHRONIZATION BASED ON WHETHER DATA APPLICATION IS IN FOREGROUND

(71) Applicant: HTC Corporation, Taoyuan County (TW)

(72) Inventors: Lan-Chin Huang, Taoyuan County (TW); Hung-Chi Lo, Taoyuan County (TW)

(73) Assignee: HTC Corporation, Taoyuan County (TW)

( * ) Notice: Subject to any disclaimer, the term of this patent is extended or adjusted under 35 U.S.C. 154(b) by 176 days.

(21) Appl. No.: 14/162,750

(22) Filed: Jan. 24, 2014

(65) Prior Publication Data
US 2014/0222757 A1 Aug. 7, 2014

Related U.S. Application Data

(60) Provisional application No. 61/759,403, filed on Feb. 1, 2013.

(51) Int. Cl.
*G06F 17/30* (2006.01)
*H04L 29/08* (2006.01)

(52) U.S. Cl.
CPC ........ *G06F 17/30578* (2013.01); *H04L 67/26* (2013.01)

(58) Field of Classification Search
CPC .................................................. G06F 17/30578
See application file for complete search history.

(56) References Cited

U.S. PATENT DOCUMENTS

| 7,460,021 B1 * | 12/2008 | Bacon | G01W 1/00 340/601 |
| 2009/0144359 A1 * | 6/2009 | Karlsen | H04L 67/26 709/203 |

(Continued)

FOREIGN PATENT DOCUMENTS

| CN | 102333069 | 1/2012 |
| CN | 102726104 | 10/2012 |

(Continued)

OTHER PUBLICATIONS

"Office Action of European Counterpart Application," issued on Jun. 5, 2015, p. 1-p. 7.

(Continued)

*Primary Examiner* — Robert Beausoliel, Jr.
*Assistant Examiner* — Hau H Hoang
(74) *Attorney, Agent, or Firm* — Jianq Chyun IP Office (57) ABSTRACT

A data synchronization method and an electronic apparatus using the same method are proposed. The method includes the following steps: determining whether a data application is switched to be executed in a foreground of a user interface of the electronic apparatus, wherein a data synchronization of the data application is performed with a data server according to a specific synchronization mode; if yes, switching to perform the data synchronization according to a push-data notification from the data server, wherein the push-data notification is related to an updating data.

19 Claims, 4 Drawing Sheets

(56) References Cited

U.S. PATENT DOCUMENTS

| | | | | |
|---|---|---|---|---|
| 2010/0077407 | A1* | 3/2010 | Luu | H04L 67/325 |
| | | | | 719/318 |
| 2010/0077468 | A1 | 3/2010 | Pragides et al. | |
| 2011/0185202 | A1 | 7/2011 | Black et al. | |
| 2011/0252423 | A1* | 10/2011 | Freedman | G06F 9/485 |
| | | | | 718/100 |
| 2012/0265873 | A1* | 10/2012 | Iund | H04L 67/32 |
| | | | | 709/224 |
| 2013/0225145 | A1* | 8/2013 | Cherian | H04W 52/0261 |
| | | | | 455/418 |
| 2014/0148205 | A1* | 5/2014 | Grinshpun | H04L 69/16 |
| | | | | 455/466 |

FOREIGN PATENT DOCUMENTS

| | | |
|---|---|---|
| EP | 1841130 | 10/2007 |
| TW | 201303717 | 1/2013 |
| WO | 2011148370 | 12/2011 |

OTHER PUBLICATIONS

"Office Action of European Counterpart Application", issued on Mar. 13, 2014, p. 1-p. 6, in which the listed references were cited.
"Office Action of Taiwan Counterpart Application", issued on May 7, 2015, p. 1-p. 6, in which the listed reference was cited.
"Office Action of European Counterpart Application," issued on May 6, 2015, p. 1-p. 7.
"Office Action of Europe Counterpart Application", issued on Nov. 25, 2015, p. 1-p. 8, in which the listed references were cited.
"Office Action of China Counterpart Application", issued on Nov. 2, 2016, p. 1-p. 8, in which the listed references were cited.

* cited by examiner

ELECTRONIC APPARATUS, COMPUTER-READABLE MEDIUM AND METHOD FOR PERFORMING DATA SYNCHRONIZATION BASED ON WHETHER DATA APPLICATION IS IN FOREGROUND

CROSS-REFERENCE TO RELATED APPLICATION

This application claims the priority benefits of U.S. provisional application Ser. No. 61/759,403, filed on Feb. 1, 2013. The entirety of the above-mentioned patent applications is hereby incorporated by reference herein and made a part of this specification.

BACKGROUND

Field of the Invention

The application relates to a synchronization method, and in particular, to a data synchronization method.

Description of Related Art

In the circumstance that the data synchronization is set to be periodically performed, the updating data arriving at the data server are not actively transferred to the client unit. Therefore, unless the user manually initiates the data synchronization between the data server and the client unit, the user will not aware of the new arriving data in the data server. In other words, the updating data arriving the data server will not be updated to the client unit until next cycle of the data synchronization. Further, without knowing whether there are new arrived data in the data server, the periodically performed data synchronizations lead to power consumption.

SUMMARY

Accordingly, the application provides a data synchronization method, which makes the data synchronization more real-time and saves the overhead.

A data synchronization method is introduced herein. The method is adapted to an electronic apparatus. The method includes the following steps: determining whether a data application is switched to be executed in a foreground of a user interface of the electronic apparatus, wherein a data synchronization of the data application is performed with a data server according to a specific synchronization mode; if yes, switching to perform the data synchronization according to a push-data notification from the data server, wherein the push-data notification is related to an updating data.

An electronic apparatus is introduced herein. The electronic apparatus includes a processing unit and a communication unit. The processing unit executes a data application. The communication unit is coupled to the processing unit and communicates with a data server. The processing unit determines whether the data application is switched to be executed in a foreground of a user interface of the electronic apparatus, wherein a data synchronization of the data application is performed with a data server according to a specific synchronization mode. If yes, the processing unit controls the communication unit to switch to perform the data synchronization according to a push-data notification from the data server, wherein the push-data notification is related to an updating data.

The application provides a computer-readable medium, which records a computer program to be loaded into a mobile device to execute the aforementioned data synchronization method. The computer program is composed of a plurality of program instructions (for example, an organization chart establishing program instruction, a table approving program instruction, a setting program instruction, and a deployment program instruction, etc), and these program instructions are loaded into a mobile device and executed by the same to accomplish various steps of the data synchronization method.

In order to make the aforementioned and other features and advantages of the application comprehensible, several exemplary examples accompanied with figures are described in detail below.

BRIEF DESCRIPTION OF THE DRAWINGS

The accompanying drawings are included to provide a further understanding of the application, and are incorporated in and constitute a part of this specification. The drawings illustrate examples of the application and, together with the description, serve to explain the principles of the application.

DETAILED DESCRIPTION OF DISCLOSED EMBODIMENTS

Some examples of the present application will now be described more fully hereinafter with reference to the accompanying drawings, in which some, but not all examples of the application are shown. Indeed, various examples of the application may be embodied in many different forms and should not be construed as limited to the examples set forth herein; rather, these examples are provided so that this disclosure will satisfy applicable legal requirements. Like reference numerals refer to like elements throughout.

Figure 1:
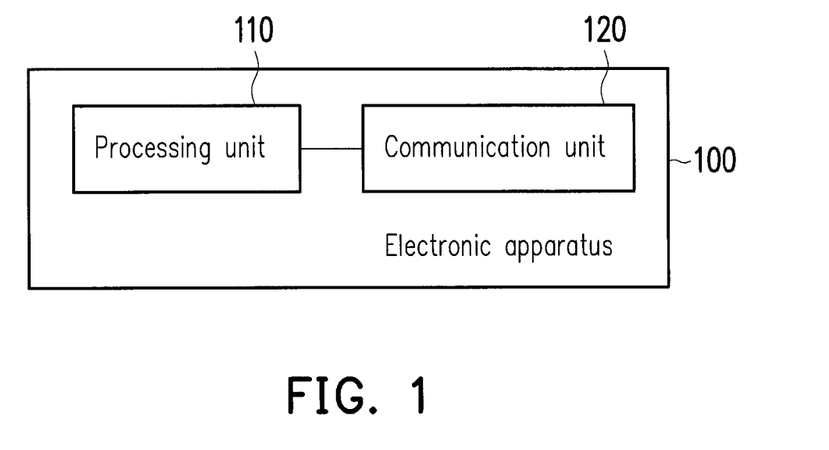
FIG. 1 is a functional block diagram illustrating an electronic apparatus according to an exemplary example of the present application.

FIG. 1 is a functional block diagram illustrating an electronic apparatus according to an exemplary example of the present application. In the present examples, the electronic apparatus 100 includes a processing unit 110 and a communication unit 120. The electronic apparatus 100 may be, for example, a computer, a tablet, a smartphone, a personal digital assistant (PDA), a padphone, an ultrabook, a laptop or the like. The processing unit 110 may be, for example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, an ARM-based processor, and the like. Also, the processing unit 110 may optionally be coupled to a memory circuit to store programming codes, device configurations, a codebook, buffered or permanent data, and etc. The functions of the processing unit 110 may be implemented using programmable units such as a micro-processor, a micro-controller, a DSP chips, FPGA, etc. The functions of the processing unit 110 may also be implemented with separate electronic devices or ICs, and the processing unit 110 may also be implemented with either hardware or software. The processing unit 110 may execute a data application for providing the desired functions of the user. The data application may be, for example, an e-mail application, instant messaging software, a calendar application, a task application or the like.

The communication unit 120 may be coupled to the processing unit 110 and configured for processing the radio frequency (RF) signals of wireless communication technologies. The wireless communication technologies may at least include, for example, global system for mobile (GSM), third generation project partnership long term evolution (3GPP LTE), code division multiple access (CDMA), wideband CDMA (WCDMA), high speed packet access (HSPA), and world interoperability for microwave access (WiMAX), etc. Besides, the communication unit 120 may be configured for processing the RF signals of wireless local area network communication technologies, e.g., wireless local area network (WLAN). Alternatively, the communication unit 120 may be configured for wirelessly accessing the Internet through a wireless local area network or other kinds of wireless network. The wireless communication unit 120 may use various wireless local area network technologies such as wireless fidelity (Wi-Fi) standard or IEEE 802.11 standard. In some examples, the communication unit 120 may receive RF signals of the aforementioned wireless communication technologies through an antenna (not shown).

In the present example, the processing unit 110 may execute a data application for providing the desired functions of the user. The data application may be, for example, an e-mail application, instant messaging software, a calendar application, a task application or the like. The processing unit 110 may control the communication unit 120 to communicate with a data server (such as a mail server) related to the data application and perform a data synchronization with the data server to retrieve data from the data server to update the information of the data application.

In general, the communication unit 120 may determine the timing of the data synchronization according to some principles. For example, the communication unit 120 may periodically perform the data synchronization with the data server. By periodically synchronizing with the data server, the overhead (such as and power consumption) of the electronic apparatus 100 could be saved. However, the user may not be able to instantly obtain the latest information from time to time.

Furthermore, the communication unit 120 may also perform the data synchronization according to the push-data mechanism. Specifically, when the communication unit 120 performs the data synchronization according to the push-data mechanism, the communication unit 120 may firstly establish a connection with the data server by sending a request (e.g., a Hypertext Transfer Protocol (HTTP) request) to the data server. Next, when there is an updating data, which hasn't been received by the communication unit 120, existing on the data server, the data server may send a push-data notification to the communication unit 120 through the connection. Please notice that the updating data may be, but no limited to, a data being added, deleted, modified or updated. After receiving the push-data notification through the connection, the communication unit 120 may accordingly perform the data synchronization to synchronize with the data server to receive the updating data related to the push-data notification. In some examples, the communication unit 120 may disconnect the connection after receiving the push-data notification through the connection. In other words, whenever there is an updating data existing on the data server, the data server would instantly notify the electronic apparatus 100 by sending the push-data notification to the communication unit 120, and the communication unit 120 would correspondingly perform the data synchronization with the data server. In some examples, if the communication unit 120 had disconnected the connection after receiving the push-data notification, the communication unit 120 may send the request to the data server to re-establish the connection. Therefore, the push-data mechanism would make the information exchange between the electronic apparatus 100 and the data server more real-time. However, the push-data mechanism may increase the overhead of the electronic apparatus 100 for constantly maintaining the connection.

By the proposed method of the present application, the advantages of the two aforementioned principles related to the data synchronization between the electronic apparatus 100 and the data server could be both achieved. Detailed description would be provided in the following discussion.

Figure 2:
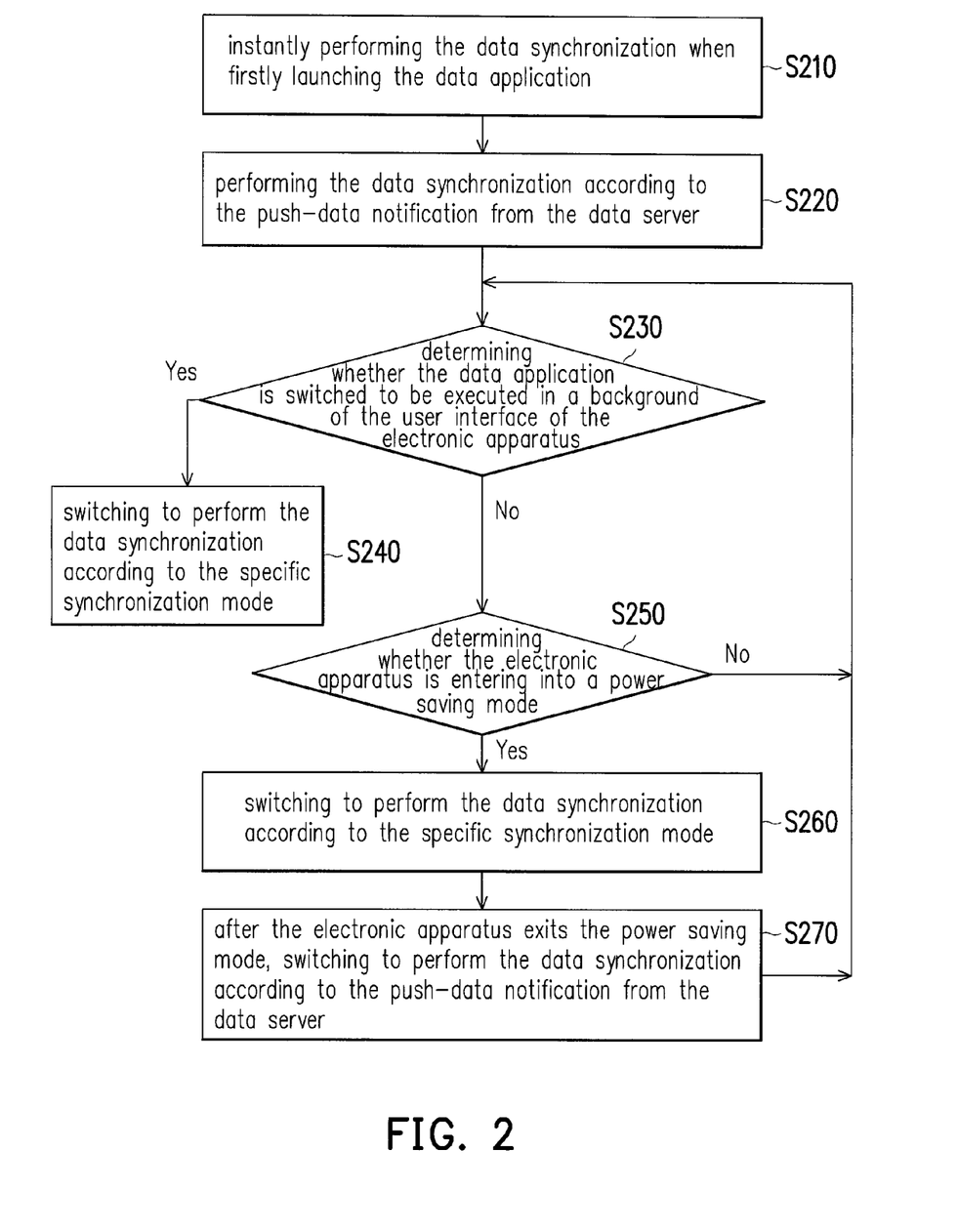
FIG. 2 is a flow chart illustrating a data synchronization method according to an exemplary example of the present application.

FIG. 2 is a flow chart illustrating a data synchronization method according to an exemplary example of the present application. The method proposed in the present example could be adapted to the electronic apparatus 100 of FIG. 1, but the application is not limited thereto.

Referring to both FIG. 1 and FIG. 2, prior to step S210, assuming that the processing unit 110 performs the data synchronization of the data application according to a specific synchronization mode. The specific synchronization mode can be regarded as the default data synchronization configuration of the data application. In one example, the specific synchronization mode may represent that the processing unit 110 periodically performs the data synchronization of the data application. In another example, the specific synchronization mode may represent that the processing unit 110 performs the data synchronization of the data application in response to a user input. That is, the user could manually control the electronic apparatus 100 to perform the data synchronization by, for example, pushing particular buttons or inputting specific commands, but the application is not limited thereto.

In step S210, the processing unit 110 may control the communication unit 120 to instantly perform the data synchronization when firstly launching the data application. In other words, the data application would be instantly updated when being executed for the first time. Taking the e-mail application for an example, the communication unit 120 would synchronize with the mail server to retrieve the mails that have not been received by the electronic apparatus 100.

In step S220, the processing unit 110 may control the communication unit 120 to perform the data synchronization according to the push-data notification from the data server. In detail, since the data application would be executed in the foreground of the user interface when being firstly launched, the data synchronization of the data application may be switched to be performed according to the push-data mechanism. The details of the push-data mechanism could be referred to the previous discussions, which would not be repeated herein. Hence, the information exchange between the electronic apparatus 100 and the data server would be real-time, such that the user may instantly receive the latest data of the data application.

In one example, the data synchronization performed according to the push-data notification from the data server (i.e., step S220) is performed for only one time. If there is no updating data, the data synchronization performed according to the push-data notification from the data server would not be performed after a predetermined duration. Afterwards, the processing unit 110 can switch from performing the data synchronization according to the push-data notification from the data server to perform the data synchronization according to the specific synchronization mode, but the present application is not limited thereto.

In step S230, the processing unit 110 may determine whether the data application is switched to be executed in a background of the user interface of the electronic apparatus 100. If no, the processing unit 110 may perform step S250 to determine whether the electronic apparatus 100 is entering into a power saving mode while the data application is still running in foreground. In the present example, the power saving mode could be generalized to a regular sleep mode, a hibernation mode, a screen-off mode (e.g. due to the display-on timeout reaches a predetermined time period) or other similar modes, which is not limited thereto. If yes, the processing unit 110 may perform step S260 to switch to perform the data synchronization according to the specific synchronization mode. Therefore, the power consumption of the electronic apparatus 100 could be further reduced while staying in the power saving mode. If the electronic apparatus 100 does not enter the power saving mode, the processing unit 110 may return to step S230. After step S260, in step S270, after the electronic apparatus 100 exits the power saving mode and the data application is still running in foreground, the processing unit 110 may switch to perform the data synchronization according to the push-data notification from the data server, and subsequently return step S230.

On the other hand, if the data application is switched to be executed in the background of the user interface of the electronic apparatus 100, the processing unit 110 may then perform step S240. In step S240, the processing unit 110 may switch to perform the data synchronization according to the specific synchronization mode. In other words, after determining the data application is currently switched to be executed in the background of the user interface, the processing unit 110 may periodically perform the data synchronization and/or perform the data synchronization in response to the user input (as default data synchronization configuration prior to S210), instead of performing the data synchronization according to the push-data mechanism. From another point of view, as long as the data application is not executed in the foreground, the data synchronization would be switched to be periodically performed or to be performed in response to the user input, which saves the overhead of the electronic apparatus 100.

Figure 3:
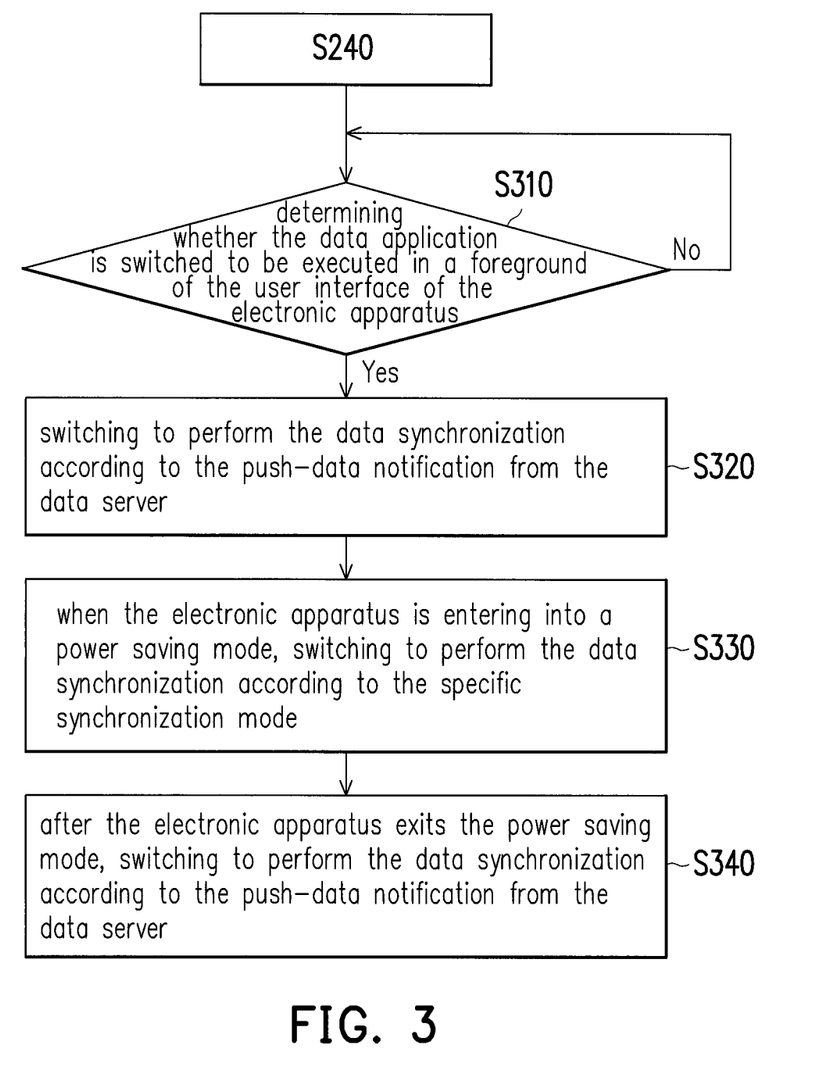
FIG. 3 is a flow chart illustrating a data synchronization method according to the example of FIG. 2.

FIG. 3 is a flow chart illustrating a data synchronization method according to the example of FIG. 2. The method proposed in the present example could also be adapted to the electronic apparatus 100 of FIG. 1, but the application is not limited thereto.

After the step S240 in FIG. 2, the processing unit 110 may further perform step S310. In step S310, the processing unit 110 may determine whether a data application is switched to be executed in the foreground of the user interface of the electronic apparatus 100. If no, the processing unit 110 may keep performing step S310. If yes, the processing unit 110 may perform step S320. In step S320, the processing unit 110 may switch to perform the data synchronization according to the push-data notification from the data server.

From another point of view, at the instant that the data application is switched to be executed in the foreground, the data synchronization would be switched to be performed according to the push-data mechanism.

In another example, at the instant that the data application is switched to be executed from background to foreground, the data synchronization would be switched to be performed according to the push-data mechanism for only one time of data synchronization. Once the one time of data synchronization is finished, the data synchronization could be switched back to be performed according to the specific synchronization mode. If there is no updating data, the data synchronization performed according to the push-data notification from the data server would not be performed after a predetermined duration.

In some examples, after step S320, the processing unit 110 may subsequently perform steps S330 and S340. In step S330, when the electronic apparatus 100 is entering into the power saving mode, the processing unit 110 may switch to perform the data synchronization according to the specific synchronization mode. Therefore, the power consumption of the electronic apparatus 100 could be further reduced while staying in the power saving mode. Next, in step S340, after the electronic apparatus 100 exits the power saving mode, the processing unit 110 may switch to perform the data synchronization according to the push-data notification from the data server, which makes the information exchange between the electronic apparatus and the data server more real-time.

Figure 4:
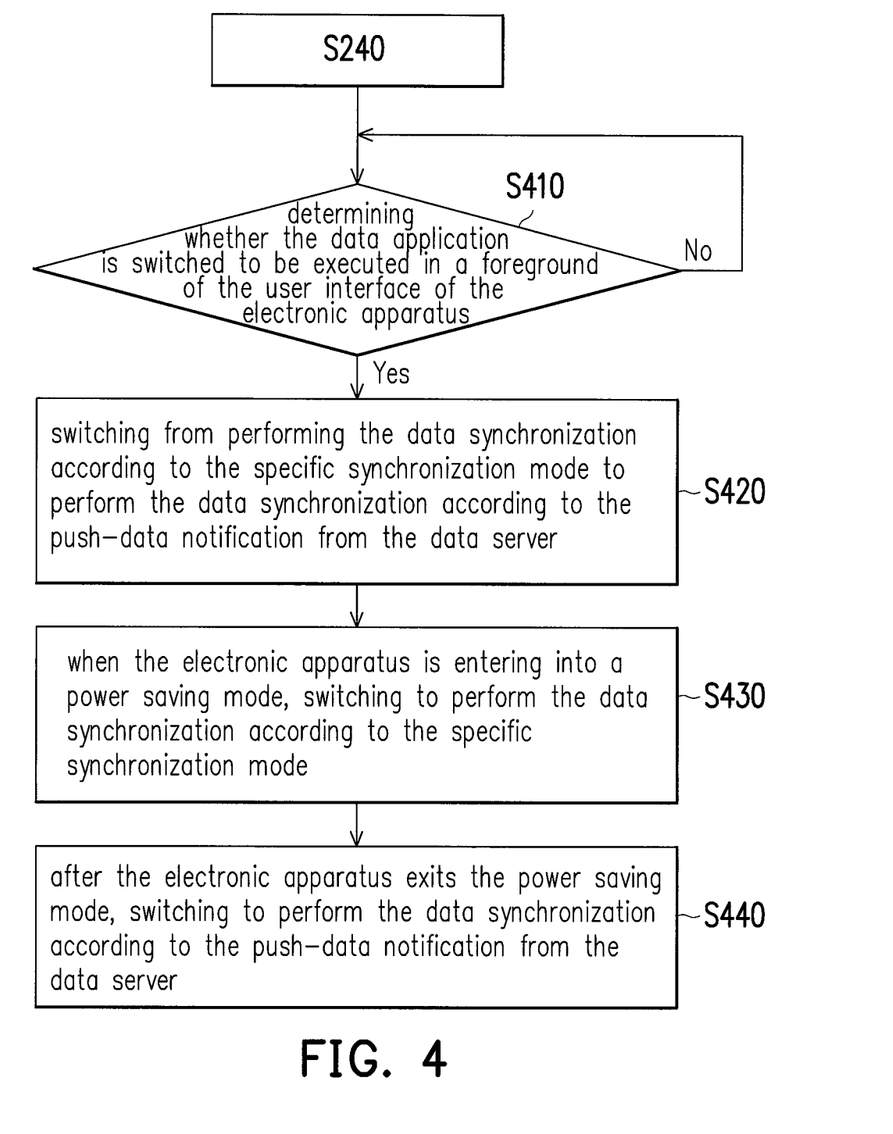
FIG. 4 is a flow chart illustrating a data synchronization method according to the example of FIG. 3.

FIG. 4 is a flow chart illustrating a data synchronization method according to the example of FIG. 3. The method proposed in the present example could also be adapted to the electronic apparatus 100 of FIG. 1, but the application is not limited thereto.

After the step S240 in FIG. 2, the processing unit 110 may further perform step S410. In step S410, the processing unit 110 may determine whether a data application is switched to be executed in the foreground of the user interface of the electronic apparatus 100. If no, the processing unit 110 may keep performing step S410. If yes, the processing unit 110 may perform step S420. In step S420, the processing unit 110 may switch from performing the data synchronization according to the specific synchronization mode to perform the data synchronization according to the push-data notification from the data server.

In another example, at the instant that the data application is switched to be executed from background to foreground, the data synchronization would be switched to be performed according to the push-data mechanism for only one time of data synchronization. Once the one time of data synchronization is finished, the data synchronization could be switched back to be performed according to the specific synchronization mode. If there is no updating data, the data synchronization performed according to the push-data notification from the data server would not be performed after a predetermined duration.

In some examples, after step S420, the processing unit 110 may subsequently perform steps S430 and S440. In step S430, when the electronic apparatus 100 is entering into the power saving mode, the processing unit 110 may switch to perform the data synchronization according to the specific synchronization mode. Therefore, the power consumption of the electronic apparatus 100 could be further reduced while staying in the power saving mode. Next, in step S440, after the electronic apparatus 100 exit from the power saving mode, the processing unit 110 may switch to perform the data synchronization according to the push-data notification from the data server, which makes the information exchange between the electronic apparatus and the data server more real-time.

The application provides a computer-readable medium, which records a computer program to be loaded into an electronic apparatus to execute the steps of the aforementioned data synchronization method. The computer program is composed of a plurality of program instructions (for example, an organization chart establishing program instruction, a table approving program instruction, a setting program instruction, and a deployment program instruction, etc), and these program instructions are loaded into the electronic apparatus and executed by the same to accomplish various steps of the data synchronization method.

To sum up, the examples of the present application provide a data synchronization method and an electronic apparatus using the same method. Through the proposed method, the data synchronization of the data application could be properly adjusted according to the execution status of the data application. Specifically speaking, when the data application is executed in the background, the data synchronization would be set to be performed according to the specific synchronization mode, which saves the overhead of the electronic apparatus. As soon as the data application is switched to be executed in the foreground, the data synchronization would be set to be performed according to the push-data mechanism, which makes the information exchange between the electronic apparatus and the data server more real-time. Hence, the advantages of the principles related to the data synchronization between the electronic apparatus and the data server could be both achieved by the proposed method of the present application.

It will be apparent to those skilled in the art that various modifications and variations can be made to the structure of the application without departing from the scope or spirit of the application. In view of the foregoing, it is intended that the application cover modifications and variations of this application provided they fall within the scope of the following claims and their equivalents.

What is claimed is:

1. A data synchronization method, adapted to an electronic apparatus, the method comprising:
   in response to a data application is switched from being executed in a background of a user interface of the electronic apparatus to be executed in a foreground of the user interface of the electronic apparatus, switching from performing a data synchronization of the data application with a data server according to a specific synchronization mode to performing the data synchronization according to a push-data notification from the data server, wherein the push-data notification is related to an updating data, and the specific synchronization mode synchronizes data periodically or manually instead of based on the push-data notification,
   wherein performing the data synchronization according to the push-data notification from the data server comprises:
      after the data application is switched from being executed in the background of the user interface of the electronic apparatus to be executed in the foreground of the user interface of the electronic apparatus, performing the data synchronization according to the push-data notification from the data server only once during the data application is executed in the foreground of the user interface of the electronic apparatus; and
      after performing the data synchronization according to the push-data notification from the data server only once, switching from performing the data synchronization according to the push-data notification from the data server to perform the data synchronization according to the specific synchronization mode during the data application is executed in the foreground of the user interface of the electronic apparatus.

2. The method as claimed in claim 1, wherein after the step of switching to perform the data synchronization according to the push-data notification from the data server, further comprising:
   determining whether the data application is switched to be executed in the background of the user interface of the electronic apparatus; and
   if yes, switching to perform the data synchronization according to the specific synchronization mode.

3. The method as claimed in claim 2, wherein after the step of determining whether the data application is switched to be executed in the background of the user interface of the electronic apparatus, further comprising:
   if the data application is not switched to be executed in the background of the user interface of the electronic apparatus, determining whether the electronic apparatus is entering into a power saving mode; and
   if yes, switching to perform the data synchronization according to the specific synchronization mode.

4. The method as claimed in claim 3, wherein after the electronic apparatus exits the power saving mode, switching to perform the data synchronization according to the push-data notification from the data server.

5. The method as claimed in claim 1, wherein the method further comprises:
   instantly performing the data synchronization when firstly launching the data application; and
   performing the data synchronization according to the push-data notification from the data server.

6. The method as claimed in claim 5, wherein the data synchronization performed according to the push-data notification from the data server is performed for only one time, and after the step of performing the data synchronization according to the push-data notification from the data server, further comprising:
   switching from performing the data synchronization according to the push-data notification from the data server to perform the data synchronization according to the specific synchronization mode.

7. The method as claimed in claim 1, wherein the specific synchronization mode comprises periodically performing the data synchronization or performing the data synchronization in response to a user input.

8. The method as claimed in claim 1, wherein after the step of switching to perform the data synchronization according to the push-data notification from the data server, further comprising:
   when the electronic apparatus is entering into a power saving mode, switching to perform the data synchronization according to the specific synchronization mode.

9. The method as claimed in claim 8, wherein after the electronic apparatus exits the power saving mode, switching to perform the data synchronization according to the push-data notification from the data server.

10. An electronic apparatus, comprising:
    a hardware-processor, executing a data application; and
    a communication unit, coupled to the processor, communicating with a data server,
    wherein the hardware-processor in response to the data application is switched from being executed in a background of a user interface of the electronic apparatus to be executed in a foreground of the user interface of the electronic apparatus, the hardware-processor switches from performing a data synchronization of the data application with the data server according to a specific synchronization mode to performing the data synchronization according to a push-data notification from the data server, wherein the push-data notification is related to an updating data, and the specific synchronization mode synchronizes data periodically or manually instead of based on the push-data notification, wherein performing the data synchronization according to the push-data notification from the data server comprises:

after the data application is switched from being executed in the background of the user interface of the electronic apparatus to be executed in the foreground of the user interface of the electronic apparatus, performing the data synchronization according to the push-data notification from the data server only once during the data application is executed in the foreground of the user interface of the electronic apparatus; and after performing the data synchronization according to the push-data notification from the data server only once, switching from performing the data synchronization according to the push-data notification from the data server to perform the data synchronization according to the specific synchronization mode during the data application is executed in the foreground of the user interface of the electronic apparatus.

11. The electronic apparatus as claimed in claim 10, wherein the hardware-processor further determines whether the data application is switched to be executed in the background of the user interface of the electronic apparatus; and if yes, the hardware-processor switches to perform the data synchronization according to the specific synchronization mode.

12. The electronic apparatus as claimed in claim 11, wherein if the data application is not switched to be executed in the background of the user interface of the electronic apparatus, the hardware-processor further determines whether the electronic apparatus is entering into a power saving mode;

if yes, the hardware-processor switches to perform the data synchronization according to the specific synchronization mode.

13. The electronic apparatus as claimed in claim 12, wherein after the electronic apparatus exits the power saving mode, the hardware-processor switches to perform the data synchronization according to the push-data notification from the data server.

14. The electronic apparatus as claimed in claim 10, wherein the hardware-processor is further configured for:

instantly performing the data synchronization when firstly launching the data application; and performing the data synchronization according to the push-data notification from the data server.

15. The electronic apparatus as claimed in claim 14, wherein the data synchronization performed according to the push-data notification from the data server is performed by the hardware-processor for only one time, and the hardware-processor is further configured for:

switching from performing the data synchronization according to the push-data notification from the data server to performing the data synchronization according to the specific synchronization mode.

16. The electronic apparatus as claimed in claim 10, wherein the specific synchronization mode comprises periodically performing the data synchronization or performing the data synchronization in response to a user input.

17. The electronic apparatus as claimed in claim 10, wherein when the electronic apparatus is entering into a power saving mode, the hardware-processor is further configured for switching to perform the data synchronization according to the specific synchronization mode.

18. The electronic apparatus as claimed in claim 17, wherein after the electronic apparatus exits the power saving mode, the hardware-processor is configured for switching to perform the data synchronization according to the push-data notification from the data server.

19. A non-transitory computer-readable medium, recording program instructions for:

in response to a data application is switched from being executed in a background of a user interface of the electronic apparatus to be executed in a foreground of the user interface of an electronic apparatus, switching from performing a data synchronization of the data application with a data server according to a specific synchronization mode to performing the data synchronization according to a push-data notification from the data server, wherein the push-data notification is related to an updating data, and the specific synchronization mode synchronizes data periodically or manually instead of based on the push-data notification, wherein performing the data synchronization according to the push-data notification from the data server comprises:

after the data application is switched from being executed in the background of the user interface of the electronic apparatus to be executed in the foreground of the user interface of the electronic apparatus, performing the data synchronization according to the push-data notification from the data server only once during the data application is executed in the foreground of the user interface of the electronic apparatus; and after performing the data synchronization according to the push-data notification from the data server only once, switching from performing the data synchronization according to the push-data notification from the data server to perform the data synchronization according to the specific synchronization mode during the data application is executed in the foreground of the user interface of the electronic apparatus.

* * * * *